H. KRIEGER & C. F. DEWEY.
PROJECTING APPARATUS.
APPLICATION FILED APR. 23, 1912.
1,075,920.
Patented Oct. 14, 1913.
2 SHEETS—SHEET 1.
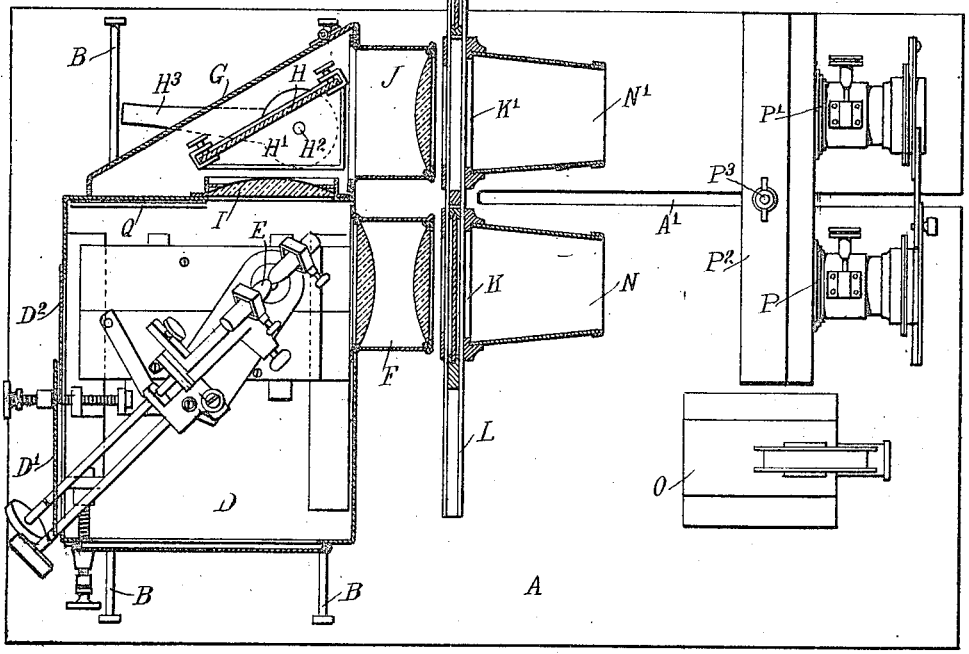
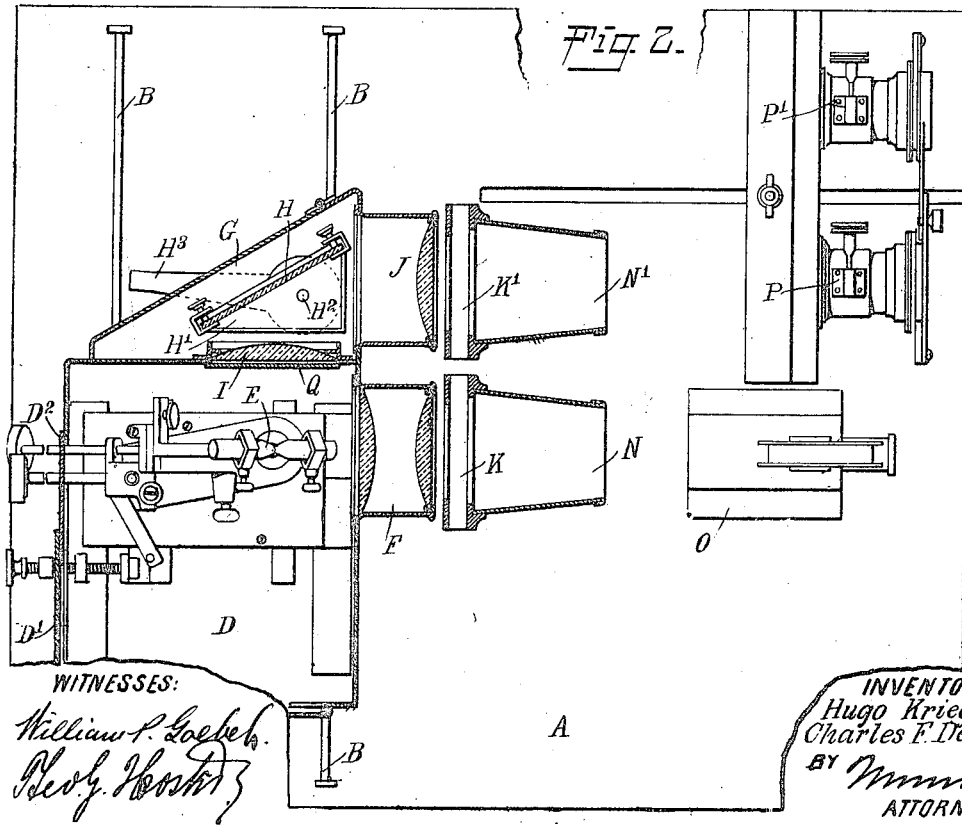
WITNESSES:
INVENTORS
Hugo Krieger
Charles F. Dewey
BY
ATTORNEYS.

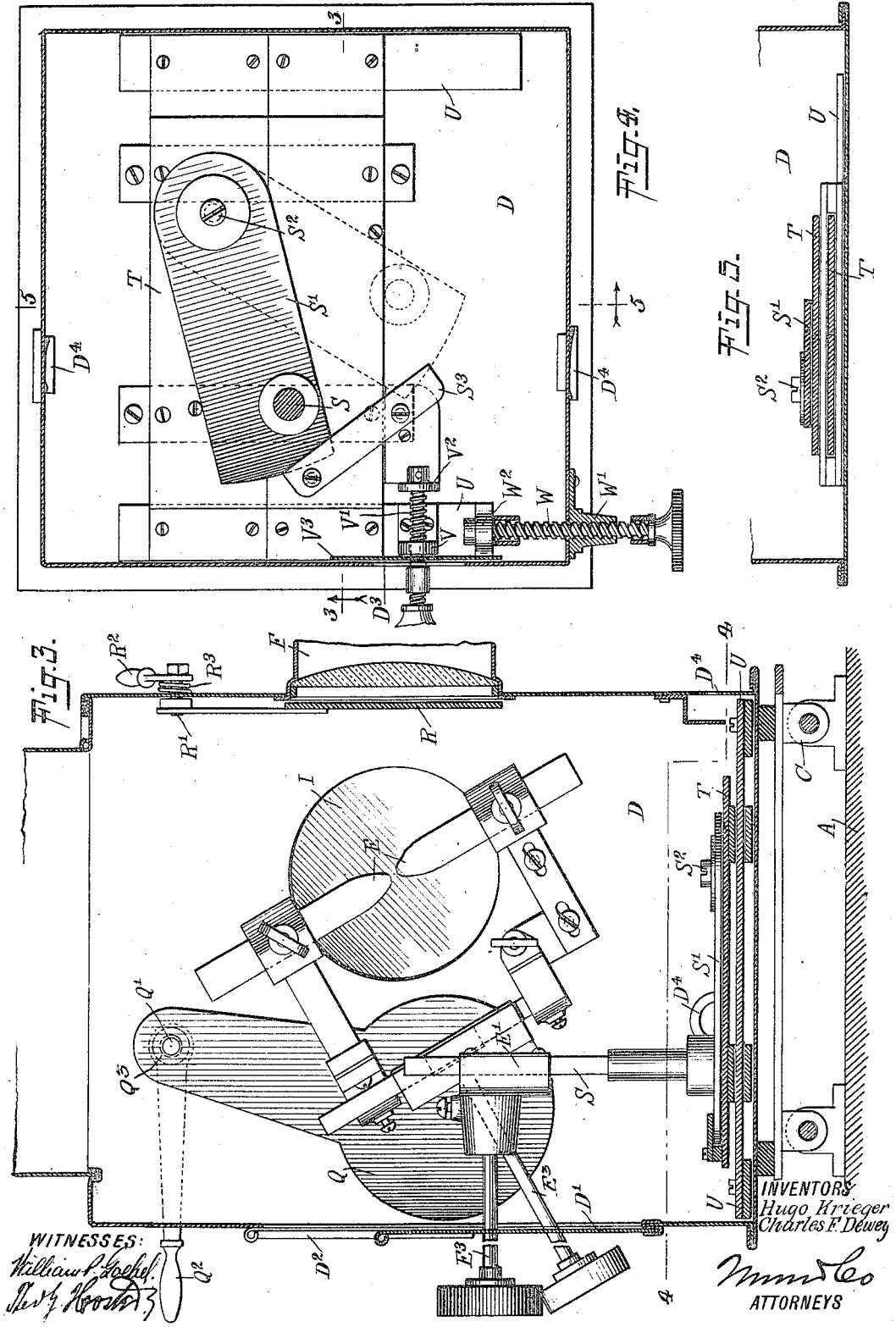

UNITED STATES PATENT OFFICE.

HUGO KRIEGER AND CHARLES FRANKLIN DEWEY, OF NEW YORK, N. Y.; SAID DEWEY ASSIGNOR TO SAID KRIEGER.

PROJECTING APPARATUS.

1,075,920.

Specification of Letters Patent.

Patented Oct. 14, 1913.

Application filed April 23, 1912. Serial No. 692,594.

*To all whom it may concern:*

Be it known that we, HUGO KRIEGER, a subject of the German Emperor, and CHARLES F. DEWEY, a citizen of the United States, both residents of the city of New York, borough of the Bronx, in the county and State of New York, have invented a new and Improved Projecting Apparatus, of which the following is a full, clear, and exact description.

The invention relates to dissolving view apparatus, such as shown and described in the Letters Patent of the United States, No. 1,001,534, granted to Hugo Krieger, on August 22, 1911.

The object of the present invention is to provide a new and improved projecting apparatus arranged for use as a dissolving view apparatus for projecting pictures, advertisements and the like singly or for use in connection with a moving picture machine to permit the user to display the pictures on the screen while the film in the moving picture machine is changed.

For the purpose mentioned use is made of a lamp casing provided at one side with a housing, condensers of which one is mounted on the lamp casing and the other on the said housing, the condensers having their axes arranged parallel one to the other, a source of light in the lamp casing, a reflecting surface in the said housing, and a condenser lens intermediate the said casing and the said housing.

A practical embodiment of the invention is represented in the accompanying drawings forming a part of this specification, in which similar characters of reference indicate corresponding parts in all the views.

Figure 1 is a sectional plan view of the projecting apparatus with the lamp casing, the housing and condensers in position for projecting dissolving views on a distant screen; Fig. 2 is a like view of the same with the lamp casing, housing and condensers in position for projecting the pictures of a moving picture machine onto a distant screen; Fig. 3 is an enlarged sectional side elevation of the lamp casing on the line 3—3 of Fig. 4; Fig. 4 is a sectional plan view of the same on the line 4—4 of Fig. 3; and Fig. 5 is a transverse section of the same on the line 5—5 of Fig. 4.

On a table or other suitable support A are arranged transverse guideways B engaged by bearings C attached to the under side of a lamp casing D provided at the inside with a source of light E, preferably in the form of an electric arc lamp, as indicated in the drawings. In front of the source of light E is arranged a condenser F, preferably having two oppositely-disposed plano-convex lenses, as shown in Figs. 1 and 2, and on one side of the casing D is arranged a housing G forming part of the casing D and containing a mirror or other reflecting surface H. In the wall between the casing D and the housing G is located a single condenser lens I intermediate the source of light E and the reflecting surface H, and on the front of the housing G is arranged a single lens condenser J having its axis parallel with the condenser F. In front of the condensers F and J are arranged transverse guideways K, K' for receiving a slide carrier L adapted to contain the pictures to be displayed on a distant screen, and on the front of the transverse guideways K, K' are arranged hoods N, N' each in the form of the frustum of a cone, the axis of which coincides with the axis of the corresponding condenser F or J. The reflecting surface H is mounted on a platform H' having a vertical shaft H² provided in the bottom of the housing G, and on the lower end of the said shaft H² is secured a handle H³ to enable the operator to turn the platform H' and with it the reflecting surface H to move the latter into proper position relative to the condenser lens I and condenser J. Instead of the reflecting surface H a prism, such as described in the United States patent above referred to, may be used, but in this case the lens I may be omitted. The guideways K, K' and the hoods N, N' are supported by suitable brackets from the casing D and the housing G so as to move in the said casing and housing on shifting the same transversely on the guideways B.

On the support A is arranged a moving picture machine O and adjacent to the moving picture machine O are arranged projecting lenses P, P', of the usual construction, for projecting an object onto a distant screen. The projecting lenses P and P' are mounted on a suitable standard P² adjustably secured to the support A by a screw P³ extending through a longitudinal slot A' formed in the support A. The moving picture machine O and the projecting lenses P, P' are so arranged one relative to the other and relative to the casing D and housing G that when the casing D and housing G are in the position shown in Fig. 2 then the condenser F is in axial alinement with the moving picture machine O to permit of projecting the pictures of the moving picture machine onto a distant screen, and at the same time the axis of the condenser J coincides with the axis of the projecting lens P to permit of using the apparatus for projecting single pictures on a distant screen during the time the films are changed in the moving picture machine O. When the casing D and the housing G are shifted transversely on the guideways B to the position shown in Fig. 1, then the axes of the condensers F and J coincide with the axes of the projecting lenses P and P' to permit of using the apparatus for displaying dissolving views on a distant screen.

When the apparatus is used for displaying the pictures of the moving picture machine O on the distant screen then the condenser lens I is covered up by a shutter Q (see Figs. 2 and 3) to utilize the rays of light emanating from the source of light E to the fullest advantage by way of the condenser F. The shutter Q is pivoted at Q' on the side wall of the casing D and on the outer end of the pivot Q' is secured a handle $Q^2$ under the control of the operator for swinging the shutter Q into an open position as shown in Figs. 1 and 3, or into a closed position over the lens I as illustrated in Fig. 2. A second shutter R is also arranged within the casing D and is adapted to open and close the condenser F to the source of light E, and this shutter R is pivoted on a pivot R' journaled in the front of the casing D, and on the outer end of the pivot R' is secured a handle $R^2$ under the control of the operator for swinging the shutter R to one side into an open position to uncover the condenser F, or into a closed position, as shown in Fig. 3, to prevent the light from passing to the condenser F, that is, during the time the apparatus is used for displaying pictures on a distant screen by way of the condenser J and the projecting lens P and while the films are changed in the moving picture machine O. A spring $R^3$ is placed between the front of the casing and the handle $R^2$ to hold the shutter R in the adjusted position, and a similar spring $Q^3$ is arranged between the rear of the casing and the handle $Q^2$ to hold the shutter Q in adjusted position.

The source of light E is arranged within the casing D in such a manner that it lies within the axis of the condenser F as well as in the axis of the condenser lens I to supply both condensers F and I with the necessary light. The source of light E when in the form of an arc light, as shown in the drawings, must be adjusted according to the use of the apparatus at the time, that is, when the apparatus is used for projecting the pictures of the moving picture machine O onto a distant screen then the crater of the carbon electrode must be moved in full position facing the condenser F (see Fig. 2), but when both condensers F and J are used for projecting dissolving views onto a distant screen then the arc lamp is turned into a dividing position (see Fig. 1) so that the crater stands at an angle of 45° to the axes of the condensers F and I to supply both condensers with an approximately equal amount of light to insure the proper projection of the dissolving views through both condensers F and J and the projecting lenses P, P'.

For the purpose mentioned the carbon electrodes are held in the usual inclined position and are adjustably mounted on a carrier E' provided with the usual shaft $E^2$, pinion and racks for moving the electrodes toward or from each other. The carrier E' is mounted to slide up and down on a post S by the use of a shaft $E^3$, pinion and rack formed on the rear face of the post S, and the post S is mounted near the free end of a horizontally-disposed swing arm S' mounted to swing on a vertical pivot $S^2$ held on a slide T mounted to slide longitudinally on a frame U mounted to slide transversely on the bottom of the lamp casing D. The free end of the swing arm S' is guided in a guideway $S^3$ attached to the top of the slide T. On the frame U is secured a nut V in which screws a screw rod V' mounted to turn in a bearing $V^2$ attached to the slide T so that when the screw rod V' is turned the slide T and with it the arc lamp E is caused to travel to the right or to the left according to the direction in which the screw rod V' is turned at the time. A similar screw rod W arranged in a transverse direction screws in a nut W' held on the front of the lamp casing D, and the said screw rod W is mounted to turn in a bearing $W^2$ held on the frame U so that when the screw rod W is turned the frame U and with it the slide T and the electric lamp E mounted thereon are shifted transversely either toward the back or toward the front according to the direction in which the screw rod W is turned.

The vertical pivot $S^2$ has its axis passing through the center of the spark between the electrodes of the arc lamp, and by the arrangement described the arc lamp can be readily adjusted so that its center lies in the axis of the condenser F and in the axis of the condenser lens I, and when the apparatus is used in conjunction with the moving picture machine O then the arm S' is swung into the position shown in Fig. 2 so that the crater of the arc lamp is in full position and faces the condenser F, and when the apparatus is used for projecting dissolving views onto a distant screen then the arm S' is swung into the position shown in Fig. 1 so that the crater of the arc lamp is in the dividing position and supplies light equally to both condensers F and I. The light received by the condenser I passes onto the reflecting surface H and is reflected by the latter to the condenser J from which the light passes through the projecting lens P' and to the screen, while the light passing to the condenser F direct from the lamp E passes through the projecting lens P and to the screen. It is understood that the weight of the lamp bearing down on the arm S' is sufficient to hold the said arm S' in either of the two positions it is moved into by the operator.

The shafts $E^2$, $E^3$ extend through the left-hand side of the casing to permit the operator to take hold of either shaft, preferably the shaft $E^3$, for imparting a swinging motion to the arm S' whenever it is desired to change the position of the arc lamp E as above explained. Vertically sliding doors D', $D^2$ are provided on the left-hand side of the lamp casing D to permit of closing the side of the casing according to the position of the shafts $E^2$, $E^3$ at the time.

The screw rod V' extends through a slot $D^3$ in the left-hand side of the casing to permit of turning the screw rod V' from the outside, and on the screw rod V' is secured a plate $V^3$ covering the opening $D^3$ at the inside to protect the interior of the casing D against light from the outside. The lower ends of the sides of the casing are provided with the usual vent holes $D^4$ for the admission of air to the casing.

Having thus described our invention, we claim as new and desire to secure by Letters Patent:

1. A projecting apparatus provided with a lamp casing, a condenser lens in the front of the casing, a condenser lens in one side of the casing, a lamp in the said casing, and manually-controlled shifting means carrying the said lamp to shift the latter into full position relative to one of the said condenser lenses or into dividing position relative to both said condenser lenses for dividing the rays of light equally to both lenses.

2. A projecting apparatus provided with a lamp casing, a condenser lens in the front of the casing, a condenser lens in one side of the casing, a lamp in said casing and a horizontal swing arm provided with a post carrying the said lamp for moving the latter into full distributing position for directing the rays of light to one of the condenser lenses, or into dividing position relative to both condenser lenses for distributing the rays of light equally to both lenses.

3. A projecting apparatus provided with a lamp casing, a condenser lens in the front of the casing, a condenser lens in one side of the casing, a lamp in the said casing, a horizontal swing arm within the said casing and provided with a post carrying the said lamp, a slide on which the said arm is pivoted and adjustable in a longitudinal direction within the casing, and a frame adjustable in a transverse direction within the said casing and on which the said slide is mounted to slide longitudinally.

4. A projecting apparatus provided with a lamp casing, a condenser lens in the front of the casing, a condenser lens in one side of the casing, a lamp in the said casing, and manually-controlled means for adjusting the said lamp in a longitudinal or transverse direction and swinging the arc lamp on a vertical axis.

5. A projecting apparatus provided with a lamp casing, a condenser lens in the front of the casing, a condenser lens in one side of the casing, a lamp in the said casing, a horizontal swing arm within the said casing and provided with a post carrying the said lamp, a slide on which the said arm is pivoted and adjustable in a longitudinal direction within the said casing, a frame adjustable in a transverse direction within the said casing and on which the said slide is mounted to slide longitudinally, a screw rod mounted to turn on the slide, a nut on the said frame in which screws the said screw rod, a second screw rod mounted to turn on the said frame, and a nut on the said casing in which screws the said second screw rod.

In testimony whereof we have signed our names to this specification in the presence of two subscribing witnesses.

HUGO KRIEGER.
CHARLES FRANKLIN DEWEY.

Witnesses:
 GEO. J. STRICKER, Jr.,
 GEORGE ZEHDER.

---

Copies of this patent may be obtained for five cents each, by addressing the "Commissioner of Patents, Washington, D. C."